(12) United States Patent
Takeda et al.

(10) Patent No.: US 7,778,538 B2
(45) Date of Patent: Aug. 17, 2010

(54) LENS BARREL

(75) Inventors: Toshiaki Takeda, Saitama (JP); Yoshitaka Mori, Saitama (JP)

(73) Assignee: Fujinon Corporation, Saitama (JP)

( * ) Notice: Subject to any disclaimer, the term of this patent is extended or adjusted under 35 U.S.C. 154(b) by 1027 days.

(21) Appl. No.: 11/487,361

(22) Filed: Jul. 17, 2006

(65) Prior Publication Data
US 2007/0024991 A1    Feb. 1, 2007

(30) Foreign Application Priority Data
Jul. 27, 2005   (JP) ............................ 2005-217549

(51) Int. Cl.
G03B 7/00        (2006.01)
(52) U.S. Cl. ........................................ 396/64
(58) Field of Classification Search ................. 396/63, 396/64, 355, 458–460
See application file for complete search history.

(56) References Cited

U.S. PATENT DOCUMENTS

| | | | | |
|---|---|---|---|---|
| 2,944,477 A | * | 7/1960 | Tesch | 396/510 |
| 4,203,661 A | * | 5/1980 | Besenmatter | 396/63 |
| 4,441,794 A | | 4/1984 | Field | |
| 4,634,250 A | * | 1/1987 | Koiwai | 396/63 |
| 5,072,249 A | * | 12/1991 | Yoshida | 396/510 |
| 5,146,259 A | * | 9/1992 | Kobayashi et al. | 396/64 |
| 5,678,108 A | * | 10/1997 | Chrosziel | 396/530 |
| 6,070,016 A | * | 5/2000 | Kaneda | 396/64 |
| 6,088,534 A | * | 7/2000 | Tominaga et al. | 396/64 |
| 6,154,613 A | * | 11/2000 | Kawai | 396/64 |
| 6,246,832 B1 | * | 6/2001 | Terada | 396/63 |
| 6,269,226 B1 | * | 7/2001 | Aoshima | 396/458 |
| 6,707,500 B1 | | 3/2004 | Tamura et al. | |
| 2003/0161049 A1 | | 8/2003 | Okada et al. | |
| 2004/0218246 A1 | | 11/2004 | Onuki et al. | |

FOREIGN PATENT DOCUMENTS

| | | | |
|---|---|---|---|
| DE | 3106636 A1 | * | 3/1982 |
| JP | 8-256288 A | | 10/1996 |
| JP | 8-279957 A | | 10/1996 |
| JP | 3610113 B2 | | 10/2004 |

* cited by examiner

Primary Examiner—W.B. Perkey
(74) Attorney, Agent, or Firm—Birch, Stewart, Kolasch & Birch, LLP (57) ABSTRACT

The present invention provides a lens barrel having an optical system capable of change of a focal length, comprising: a diaphragm device which controls a light amount of light incident to the optical system and passing to an image forming surface; and an open F value varying device which is provided separately from the diaphragm device, controls a light amount of the light incident to the optical system and passing to the image forming surface and varies an open F value by limiting the light amount so that the open F value becomes a value according to a focal length of the optical system when the light amount which is controllable by the diaphragm device is at the maximum.

18 Claims, 6 Drawing Sheets

LENS BARREL

BACKGROUND OF THE INVENTION

1. Field of the Invention

The present invention relates to a lens barrel and particularly to a lens barrel having a diaphragm mechanism for changing an open F value according to a focal length in a zoom lens (image pickup lens with variable focal length).

2. Description of the Related Art

A zoom lens with a variable focal length in which an open F value is adjusted according to a focal length by limiting a maximum opening amount of a diaphragm is proposed in Japanese Patent No. 3610113. According to this, with a trend of size reduction and higher magnification of a zoom lens, a defocus amount (spherical aberration) tends to get bigger when the diaphragm is opened, and thus, it is proposed that the maximum opening amount of the diaphragm is limited to the extent that the defocus amount does not become poor. That is, an F value when the diaphragm is not opened to the maximum is set as an open F value, and it is so constituted that the diaphragm opening amount is changeable only in a range that a favorable optical performance can be obtained. Moreover, since the defocus amount differs depending on a focal length, it is also suggested that a maximum opening amount to be limited is changed according to a focal length.

However, according to Japanese Patent No. 3610113, since the open F value is limited by limiting on control a maximum opening amount of a diaphragm for exposure control to be controlled by a motor such as an IG meter, there is a problem that diaphragm control gets complicated and delayed. There is also another problem that the diaphragm for exposure control can not be manually operated.

The present invention has been made in view of the above circumstances and has an object to provide a lens barrel which can change the open F value according to the focal length with a simple mechanism and with a high accuracy without deteriorating an optical performance.

SUMMARY OF THE INVENTION

In order to achieve the above object, a lens barrel described in a first aspect of the present invention is a lens barrel having an optical system capable of change of a focal length, comprising a diaphragm device which controls a light amount of light incident to the optical system and passing to an image forming surface, and an open F value varying device which is provided separately from the diaphragm device, controls the light amount of the light incident to the optical system and passing to the image forming surface and varies an open F value by limiting the light amount so that the open F value becomes a value according to a focal length of the optical system when the light amount which is controllable by the diaphragm device is at the maximum.

According to the present invention, since the device which varies the open F value is provided separately from a usual diaphragm device for exposure control, individual construction and control are made possible, and construction in structure or control is simplified compared with a case where the open F value is limited by the usual diaphragm device.

The lens barrel according to a second aspect of the present invention is characterized in that, in the invention described in the first aspect, the open F value varying device varies the open F value in mechanical conjunction with a member operating with a change of a focal length of the optical system.

According to the present invention, when the focal length is changed, the open F value varying device varies the open F value to an appropriate value according to the focal length in mechanical conjunction with that. Thus, special control of the open F value varying device is not required and the open F value can be varied with a high accuracy.

The lens barrel according to a third aspect of the present invention is characterized in that, in the invention described in the first aspect or the second aspect, the open F value varying device comprises an opening for passing light and a device which changes an opening amount of the opening.

According to the present invention, the open F value varying device may be constituted similarly to a usual diaphragm mechanism which varies the opening amount of the opening by a diaphragm blade, for example.

The lens barrel according to a fourth aspect of the present invention is characterized in that, in the invention according to the first, second or third aspect, the diaphragm device comprises an opening for passing light and a device which changes an opening amount of the opening in mechanical conjunction with an operation member operated manually.

According to the present invention, since the open F value varying device is provided separately from the diaphragm device, the diaphragm device can be a manually operated diaphragm as in the present invention, and an F value can be set with a higher accuracy as compared with an electrically operated one. Also, since there is no need to provide a mechanism for limiting the open F value at the diaphragm device by providing the open F value varying device separately from the diaphragm device as in the present invention, there is no such a problem that the structure is complicated, but an appropriate open F value can be set without considering limitation of the opening amount at diaphragm control so that the optical performance is not deteriorated.

According to the lens barrel of the present invention, change of the open F value according to the focal length can be carried out with a simple mechanism and with a high accuracy so that the optical performance is not deteriorated.

DETAILED DESCRIPTION OF THE PREFERRED EMBODIMENT

A preferred embodiment of the lens barrel according to the present invention will be described below referring to the attached drawings.

Figure 1:
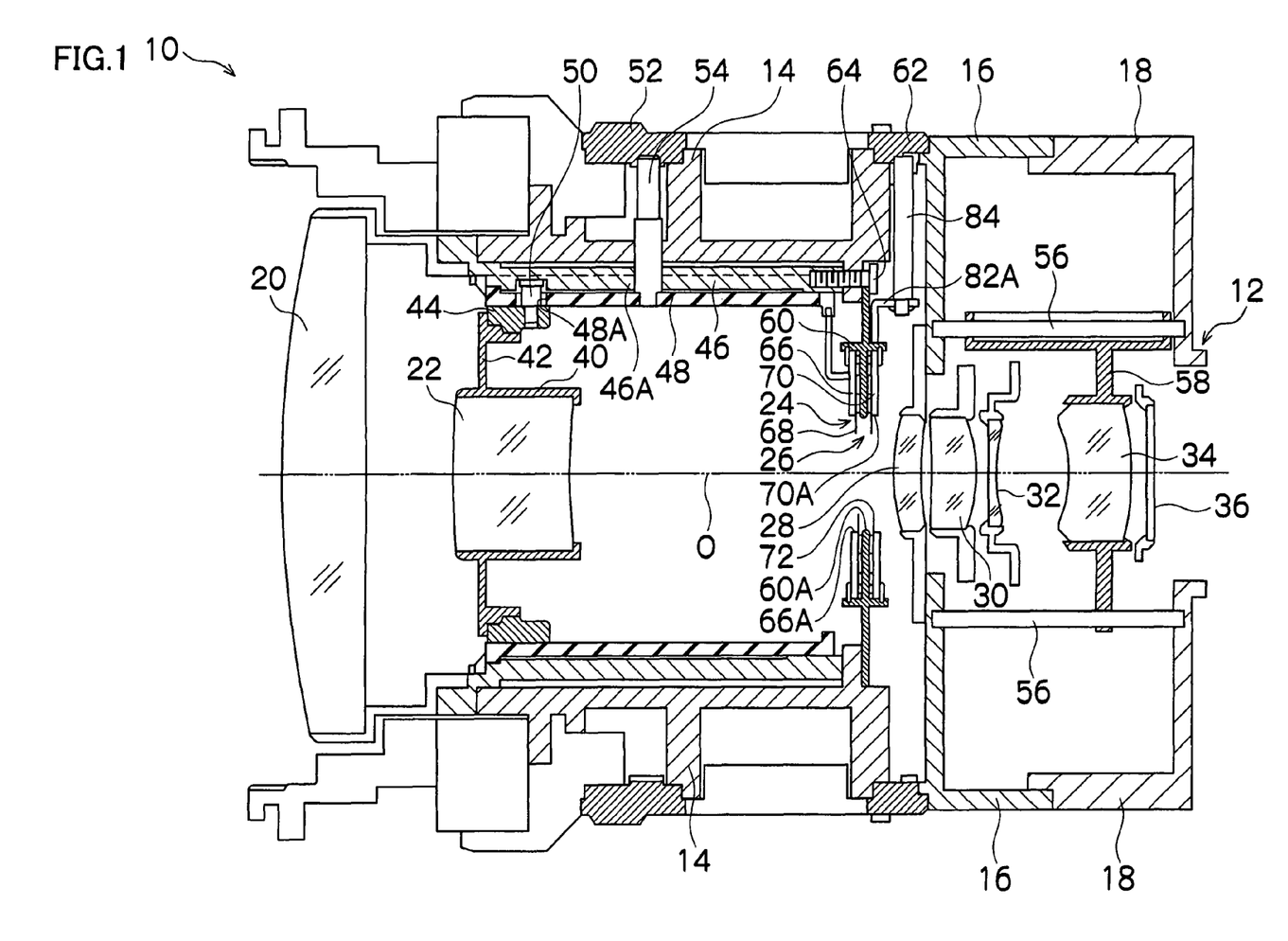
FIG. 1 is a side sectional view showing a lens barrel of a zoom lens used in a monitor camera or the like, for example, to which the present invention is applied.

FIG. 1 is a side sectional view showing a lens barrel of a zoom lens used in an ENG camera, a video camera, a monitor camera or the like, for example, to which the present invention is applied.

A lens barrel 10 in this figure is provided with a lens mount 12, whose detail is omitted, formed at its rear end and is detachably attached to a camera head, not shown, by this lens mount 12.

A fixed cylinder of the lens barrel 10 comprises a front fixed cylinder 14, a middle fixed cylinder 16 and a rear fixed cylinder 18 connected in series, and each of members constituting the lens barrel 10 is supported by these fixed cylinders 14, 16, 18.

On an optical axis O of the lens barrel 10, there are arranged as an optical system for forming an image of a subject in order from the object side, a fixed lens (group) 20, a zoom lens (group) 22, a front diaphragm 24, a rear diaphragm 26, a fixed lens (group) 28, a vibration-proof lens (group) 30, a fixed lens (group) 32, a focus lens (group) 34 and a fixed lens (group) 36.

The zoom lens 22 is to vary a zoom magnification (focal length) of the optical system and movably supported in the optical axial direction. A flange portion 42 is formed at a holding frame 40 of the zoom lens 22, and the zoom lens 22 is connected to a moving cylinder 44 through the flange portion 42. An intermediate cylinder 46 is fixed to an inner circumference portion of the front fixed cylinder 14, a rotating cylinder 48 is rotatably held by an inner circumference portion of the intermediate cylinder 46, and the moving cylinder 44 is held by an inner circumference portion of the rotating cylinder 48.

Moreover, a straight groove 46A in the optical axial direction is formed on the inner circumference surface of the intermediate cylinder 46, and a cam groove (cam-shaped hole) 48A is formed in the rotating cylinder 48. A cam pin 50 fixed to the moving cylinder 44 is inserted through the cam groove 48A of the rotating cylinder 48 and is engaged with the straight groove 46A of the intermediate cylinder 46. By this, the moving cylinder 44 is moved straight in the optical axial direction in a state where rotation is restricted, and the cam pin 50 is held at a position engaged with the cam groove 48A. When the rotating cylinder 48 is rotated, an intersection position between the cam groove 48A of the rotating cylinder 48 and the straight groove 46A of the intermediate cylinder 46 is changed to a position according to a cam shape, and the moving cylinder 44 is moved forward or backward in the optical axial direction by movement of the cam pin 50 to the intersection point.

On the other hand, a zoom ring 52 is rotatably arranged on an outer circumference portion of the front fixed cylinder 14, and a rod-state connection rod 54 is mounted inward in the radial direction on an inner circumferential surface of the zoom ring 52. This connection rod 54 is inserted through a long hole in the circumferential direction formed at the front fixed cylinder 14 and the intermediate cylinder 46 and is connected to the rotating cylinder 48. By this, when the zoom ring 52 is rotationally operated, the rotating cylinder 48 is rotationally moved in conjunction with that. When the rotating cylinder 48 is rotationally moved, the moving cylinder 44 is moved forward or backward as mentioned above, and the zoom lens 22 is moved in the optical axial direction in conjunction with the moving cylinder 44. Therefore, zoom magnification is changed by rotational operation of the zoom ring 52.

The vibration proof lens 30 is supported by a support mechanism, not shown, movably in the vertical and horizontal directions in a surface crossing the optical axis. Moreover, driving in the vertical and horizontal directions of the vibration proof lens 30 is performed by a motor of a driving mechanism, not shown. And by controlling the motor, a position in the vertical and horizontal directions of the vibration proof lens 30 is controlled. When the vibration proof lens 30 is displaced in the vertical or horizontal direction, an image forming position of an image is also displaced in the vertical or horizontal direction according to the displacement. Thus, when the lens barrel 10 is vibrated, by displacing the vibration proof lens 30 so that image fluctuation by the vibration is cancelled, the image fluctuation is prevented. Detailed explanation on vibration insulation will be omitted.

The focus lens 34 is to change a focal position of the optical system and is movably supported in the optical axial direction. Though detail will be omitted, guide rods 56, 56 are provided in the optical axial direction between the middle fixed cylinder 16 and the rear fixed cylinder 18, and a holding frame 58 of the focus lens 34 is connected to the guide rods 56, 56. By moving the holding frame 58 by a driving mechanism (an electric or a manual driving mechanism), not shown, along the guide rods 56, 56, the focus lens 34 is moved forward or backward in the optical axial direction.

The front diaphragm 24 and the rear diaphragm 26, whose detail will be described later, are constituted capable of opening/closing operation by diaphragm blades 68, 72 arranged at a common base plate 60. The rear diaphragm 26 is a usual diaphragm for exposure control and is opened/closed by rotational operation of an iris ring 62 rotatably arranged between the front fixed cylinder 14 and the middle fixed cylinder 16.

On the other hand, the front diaphragm 24 is an open F value varying device which varies an open F value according to the focal length of the optical system and is opened/closed in conjunction with rotational movement of the rotating cylinder 48. Therefore, when the zoom ring 52 is rotationally operated, the zoom lens 22 is moved in the optical axial direction, and the focal length is changed. And at the same time, the front diaphragm 24 is opened/closed so as to have an opening amount corresponding to the focal length. That is, exposure control is performed by the rear diaphragm 26 in principle, but the open F value in which an exposure amount is not increased any more even if the opening amount of the rear diaphragm 26 is increased more than a certain amount (minimum F value) is limited by the opening amount of the front diaphragm 24. Moreover, the open F value is varied to an appropriate value according to the focal length.

The front diaphragm 24 and the rear diaphragm 26 will be described below in detail. In FIG. 1, the common base plate 60 of the front diaphragm 24 and the rear diaphragm 26 is fixed to the front fixed cylinder 14 by a screw 64 together with the intermediate cylinder 46. A circular opening 60A is provided at the base plate 60, and the center of the opening 60A is arranged at a point substantially matching the optical axis O. On the front face side of the base plate 60, a cam plate (clip washer) 66 having an opening 66A with a position and a size substantially matching the opening 60A of the base plate 60 is rotatably mounted with holding diaphragm blades 68, 68..., which will be described later, between them, and a cam plate (clip washer) 70 having an opening 70A with a position and a size substantially matching the opening 60A of the base plate 60 is rotatably mounted also on the back face side of the base plate 60 holding diaphragm blades 72, 72..., which will be described later, between them.

Figure 2:
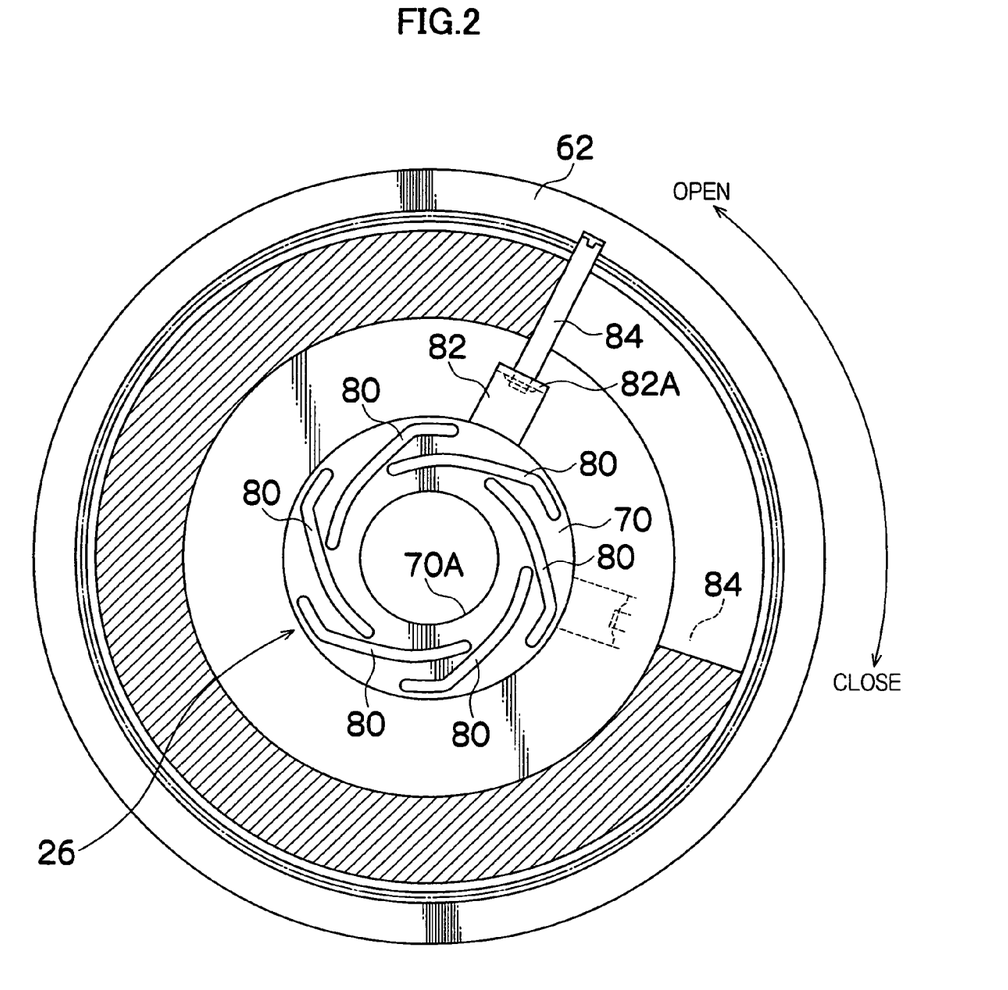
FIG. 2 is a view of a cam plate of a rear diaphragm and major components arranged on its rear side shown from a front direction of an optical axis.

Next, a structure of a diaphragm mechanism in which the front diaphragm 24 and the rear diaphragm 26 are constituted integrally will be described in detail. FIG. 2 is a view of the cam plate 70 of the rear diaphragm 26 and major components arranged on its rear side shown from the front direction of the optical axis. As shown in this figure, the cam plate 70 of the rear diaphragm 26 is formed in a disk state and rotatably held on the back face side of the base plate 60. The opening 70A is formed at the center of the cam plate 70, and cam grooves (long holes forming a cam) 80, 80... to be engaged with a cam pin projected at the diaphragm blades 72, 72 . . . , which will be shown later, are formed around the opening 70A.

Moreover, a connection portion 82 is projected at the cam plate 70, and one end of a rod-state connection rod 84 is mounted to a portion 82A (See FIG. 1) bent in the optical axis direction of the connection portion 82. On the other hand, the other end side of the connection rod 84 is mounted to the iris ring 62. By this, when the iris ring 62 is rotatably operated, the cam plate 70 is rotationally moved. In this figure, a position of the connection rod 84 when the rear diaphragm 26 is fully opened and a position of the connection rod 84 when fully closed are shown, and the iris ring 62 is operated in a range of about 90 degrees.

Figure 3:
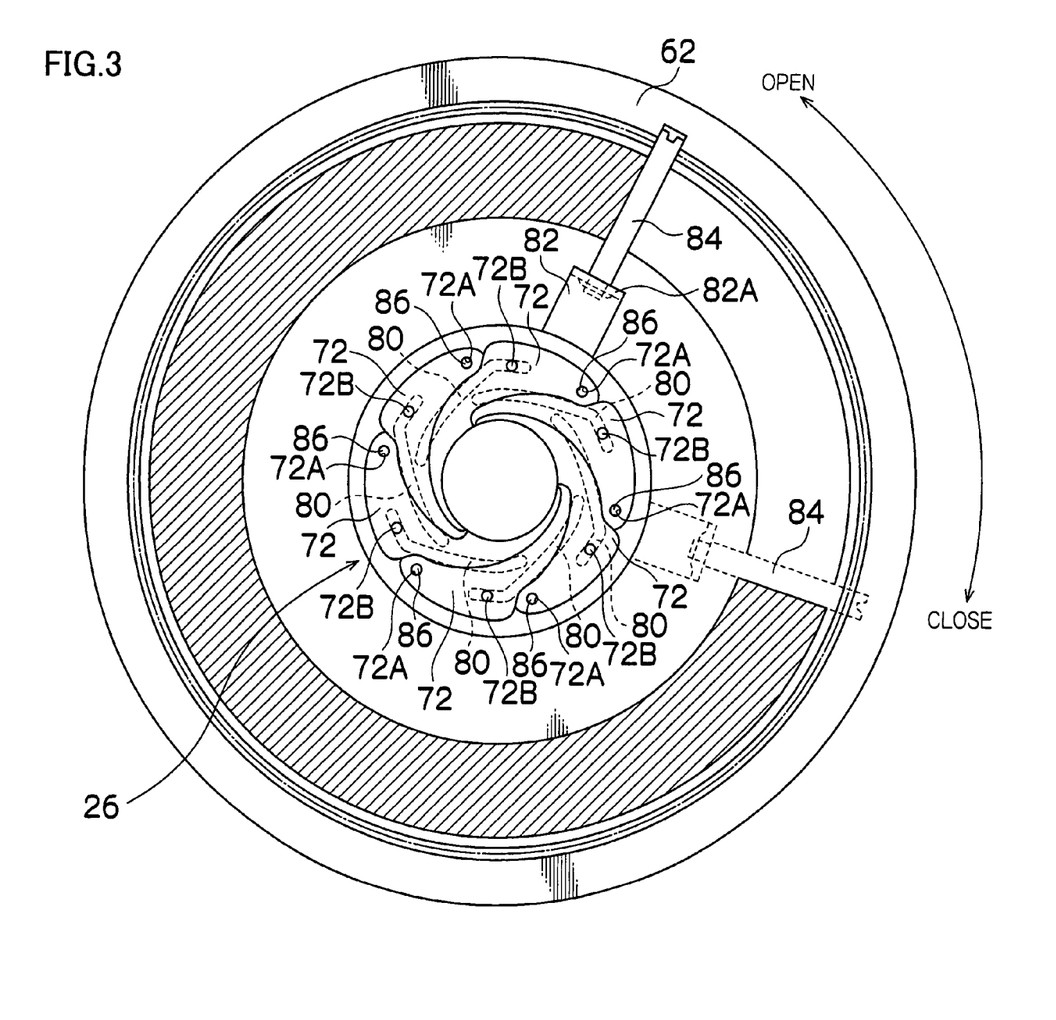
FIG. 3 is a view showing diaphragm blades arranged on a front face side of the cam plate.

FIG. 3 is a view showing the diaphragm blades 72, 72 . . . arranged on the front face side of the cam plate 70. As shown in this figure, the rear diaphragm 26 comprises six diaphragm blades 72, 72 . . . . On the base plate 60 (See FIG. 1), pins 86, 86 . . . for rotatably supporting each of the diaphragm blades 72 are projected, and by fitting each of the pins 86 in a hole 72A formed in each of the diaphragm blades 72, each of the diaphragm blades 72 is rotatably supported around each of the pins 86.

On the other hand, on the back face side of each of the diaphragm blades 72, a cam pin 72B is projected, and each of the cam pins 72B is fitted into each of the corresponding cam grooves 80 of the cam plate 70. By this, when the cam plate 70 is rotated, each of the diaphragm blades 72 is rotationally moved around the pin 86 to a position where the cam pin 72B is engaged with the cam groove 80 of the cam plate 70. By rotational movement of each of the diaphragm blades 72 according to the cam groove 80, the opening amount of the rear diaphragm 26 is varied.

Figure 4:
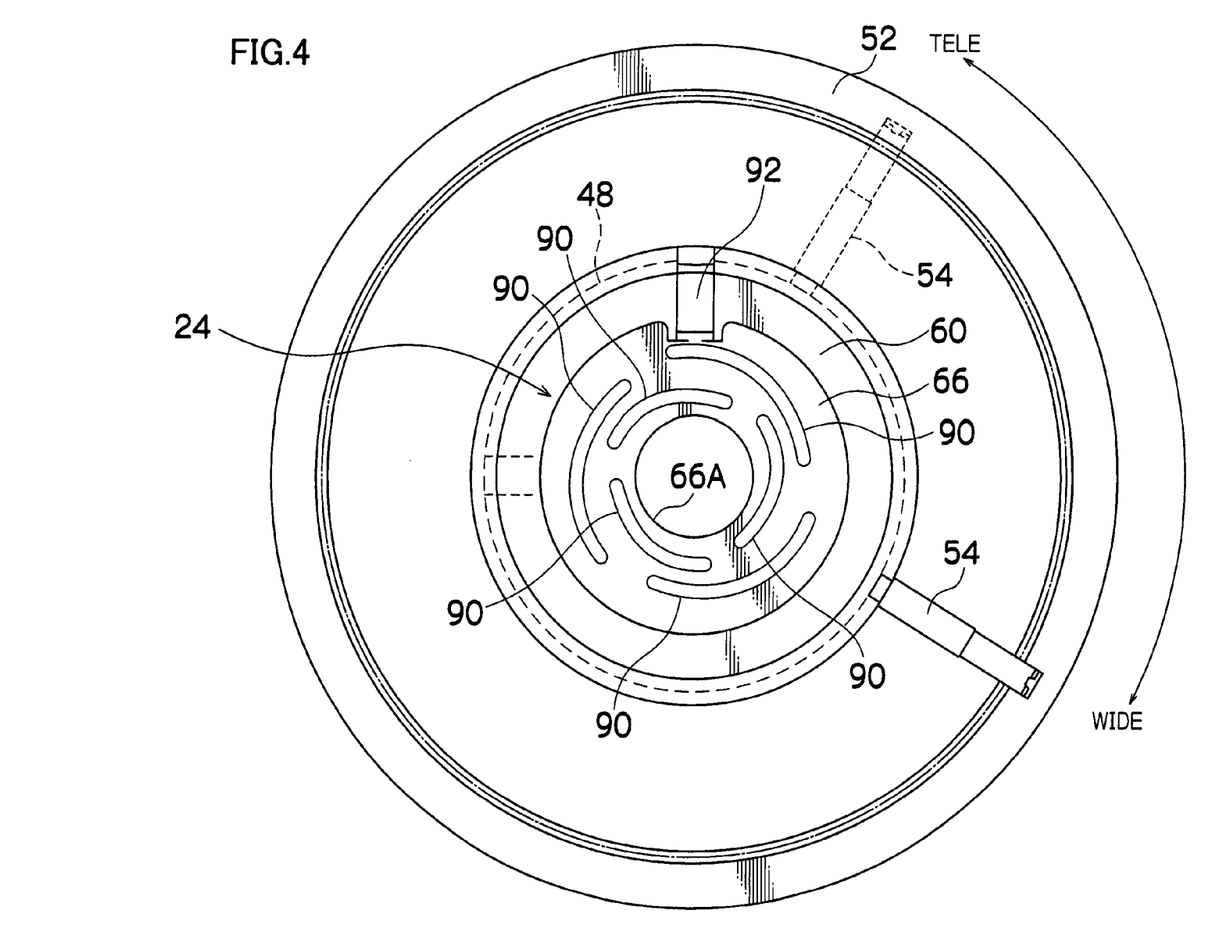
FIG. 4 is a view of a cam plate of a front diaphragm and major components arranged on its front side shown from a rear direction of the optical axis.

FIG. 4 is a view of major components arranged on the front side of the cam plate 66 of the front diaphragm 24 shown from the rear direction of the optical axis. As shown in this figure, the cam plate 66 of the front diaphragm 24 is formed in a disk state and rotatably held on the front face side of the base plate 60. The opening 66A is formed at the center of the cam plate 66, and cam grooves (long holes forming a cam) 90, 90 . . . to be engaged with cam pins projected on the diaphragm blades 68, 68 . . . , which will be shown later, are formed around the opening 66A. Moreover, a connection portion 92 is projected on an outer circumference portion of the cam plate 66, and a tip end of the connection portion 92 is connected to the rotating cylinder 48. The rotating cylinder 48 is, as shown also in FIG. 1, connected by the connection rod 54 to the zoom ring 52 and is rotationally moved with the zoom ring 52. By this, rotational operation of the zoom ring 52 rotationally moves the cam plate 66.

Figure 5:
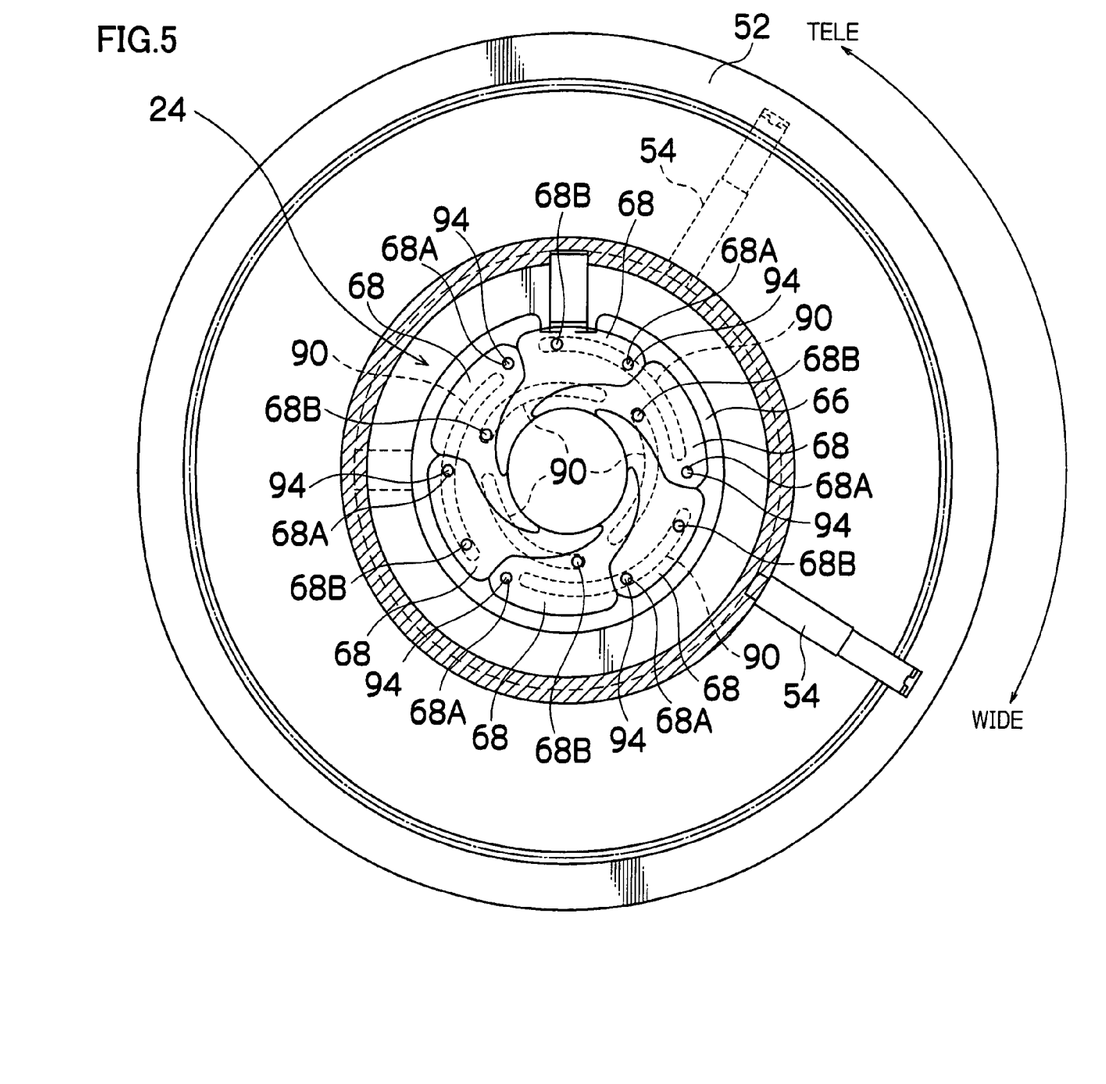
FIG. 5 is a view showing diaphragm blades arranged on a rear face side of the cam plate.

FIG. 5 is a view showing the diaphragm blades 68, 68 . . . arranged on the back face side of the cam plate 66. As shown in this figure, the front diaphragm 24 comprises six diaphragm blades 68, 68 . . . . Pins 94, 94 . . . for rotatably supporting each of the diaphragm blades 68 are projected at the base plate 60, and by fitting each of the pins 94 in a hole 68A formed at each of the diaphragm blades 68, each of the diaphragm blades 68 is rotatably supported around each of the pins 94.

On the other hand, a cam pin 68B is projected on the front face side of each of the diaphragm blades 68, and each of the cam pins 68B is fitted in each of the corresponding cam grooves 90 of the cam plate 66. By this, when the cam plate 66 is rotated, each of the diaphragm blades 68 is rotationally moved around the pin 94 to a position where the cam pin 68B is engaged with the cam groove 90 of the cam plate 66. Rotational movement of each of the diaphragm blades 68 according to the cam groove 90 varies the opening amount of the front diaphragm 24.

Figure 6:
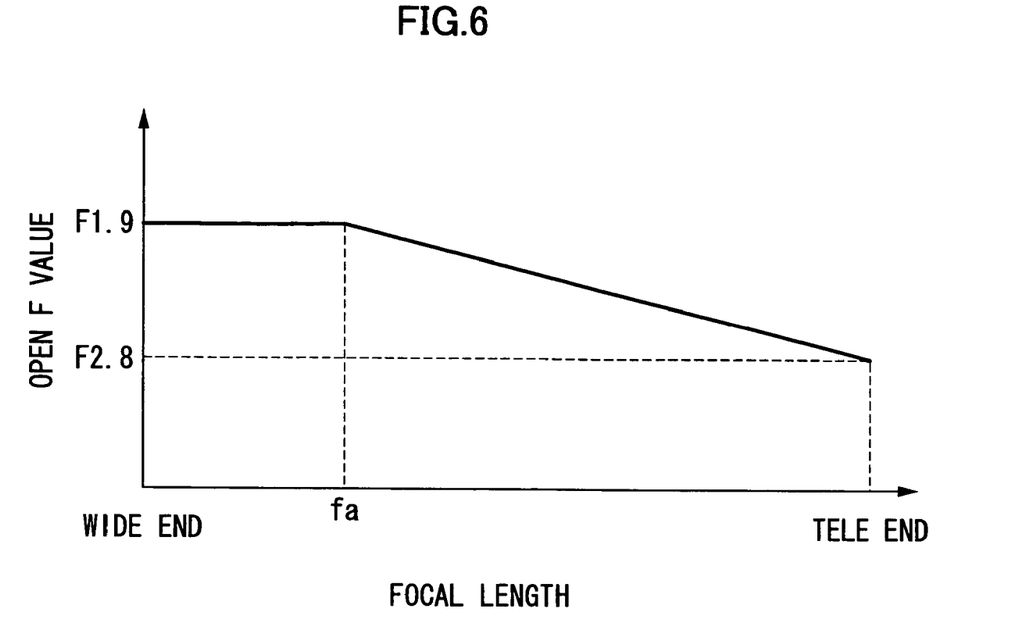
FIG. 6 is a view showing a relation between a focal length determined by a rotating position of a zoom ring and an open F value determined by an opening amount of the front diaphragm according to the rotating position of the zoom ring.

Here, FIG. 6 shows a relation between a focal length determined by a rotational position of the zoom ring 52 and an open F value determined by the opening amount of the front diaphragm 24 according to the rotational position of the zoom ring 52. As shown in this figure, in the case where the focal length is smaller than a predetermined focal length fa (wide side), the front diaphragm 24 is in the substantially open (maximum opening amount) state, and the open F value is held at the state of F1.9, for example. That is, in a section from the focal length at the wide end to the focal length fa, the shape of the cam groove 90 of the cam plate 66 is formed so that each of the diaphragm blades 68 is held substantially open even though the cam plate 66 of the front diaphragm 24 is rotated. On the other hand, if the focal length is larger than fa (tele side), when the focal length gets larger, the opening amount is gradually decreased, and when the focal length reaches the maximum (tele end), the open F value becomes F2.8. That is, in a section where the focal length is larger than fa, the shape of the cam groove 90 of the cam plate 66 is formed so that the opening amount of each of the diaphragm blades is decreased when the cam plate 66 is rotated to the tele side.

In this way, by varying the opening amount of the front diaphragm 24 in conjunction with rotational operation of the zoom ring 52, the open F value is regulated to an appropriate value according to the focal length, and in whatever state the opening amount of the rear diaphragm 26 is, the value is limited within a range of an F value larger than the open F value regulated by the front diaphragm 24. That is, even if the opening amount of the rear diaphragm 26 for exposure control is controlled by an operator by operating the iris ring 62 without considering deterioration of the optical performance, the optical characteristics of the optical system is maintained in a favorable state. Moreover, in the case where the vibration proof lens 30 is included as in the lens barrel of this preferred embodiment, since deterioration of the optical performance can be remarkable due to displacement of the vibration proof lens 30, prevention of deterioration in the optical performance by varying the open F value as above is particularly effective.

In the above preferred embodiment, both the front diaphragm 24 for varying the open F value and the rear diaphragm 26 for exposure control are operated in conjunction with manual operation, but the invention is not limited to this. The front diaphragm 24 for varying the open F value may be an electric mechanism driven by a motor, for example, so that the opening amount of the front diaphragm 24 is changed by the motor according to the focal length detected by a sensor. Moreover, the rear diaphragm 26 may also be an electric mechanism driven by a motor. When the front diaphragm 24 is mechanically varied according to the focal length, a member connected to the cam plate 66 of the front diaphragm 24 may be a member operating with the change of the focal length.

Moreover, the construction of front diaphragm 24 and the rear diaphragm 26 is not limited to diaphragm blades as in the above preferred embodiment but may be any structure only if it is a device which varies a passing light amount. Furthermore, as a device which varies the open F value, not as the front diaphragm 24 for varying the opening amount of the opening, but it may be a device which varies the open F value by moving a position of an opening with a fixed size in the fore-and-aft direction along the optical axis according to the focal length.

What is claimed is:

1. A lens barrel having an optical system capable of change of a focal length, comprising:
   a diaphragm device which controls a light amount of light incident to the optical system and passing to an image forming surface; and
   an open F value varying device which is provided separately from the diaphragm device, controls a light amount of the light incident to the optical system and passing to the image forming surface and varies an open F value by limiting the light amount so that the open F value becomes a value according to a focal length of the optical system when the light amount which is controllable by the diaphragm device is at the maximum, the open F value varying device including
   a base plate substantially perpendicular to and centered about an optical axis of the optical system, the base plate including a plurality of base pins,
   a cam plate substantially perpendicular to and centered about the optical axis, the cam plate including a plurality of cam grooves disposed around the optical axis, the plurality of cam grooves being divided into two groups, one group having a position spaced a first radial distance away from a center of the cam plate, and a second group having a position spaced a second radial distance, greater than the first radial distance, away from the center, and
   a plurality of blades, each blade of the plurality of blades attached to one base pin of the plurality of base pins and including a cam pin projected from a face of the blade and engaged in one of the plurality of cam grooves, the plurality of blades rotating about the base pins according to rotation of the cam plate and a shape of the cam grooves.

2. The lens barrel according to claim 1, wherein the open F value varying device varies the open F value in mechanical conjunction with a member operating with a change of a focal length of the optical system.

3. The lens barrel according to claim 1, wherein the open F value varying device comprises an opening for passing light and a device which changes an opening amount of the opening.

4. The lens barrel according to claim 2, wherein the open F value varying device comprises an opening for passing light and a device which changes an opening amount of the opening.

5. The lens barrel according to claim 1, wherein the diaphragm device comprises an opening for passing light and a device which changes an opening amount of the opening in mechanical conjunction with an operation member operated manually.

6. The lens barrel according to claim 2, wherein the diaphragm device comprises an opening for passing light and a device which changes an opening amount of the opening in mechanical conjunction with an operation member operated manually.

7. The lens barrel according to claim 3, wherein the diaphragm device comprises an opening for passing light and a device which changes an opening amount of the opening in mechanical conjunction with an operation member operated manually.

8. The lens barrel according to claim 4, wherein the diaphragm device comprises an opening for passing light and a device which changes an opening amount of the opening in mechanical conjunction with an operation member operated manually.

9. The lens barrel according to claim 1, further comprising:
   a plurality of lens groups arranged along an optical axis direction, wherein
   the open F value varying device is surrounded from two opposite sides along the optical axis direction by one or more of the plurality of lens groups.

10. The lens barrel according to claim 9, wherein the diaphragm and the open F value varying device are each disposed in a fixed position in the optical axis direction.

11. The lens barrel according to claim 1, further comprising:
    an iris ring mechanically coupled to the diaphragm device, wherein
    the diaphragm includes an aperture controlling the light amount, and
    a rotational movement of the iris ring changes the aperture of the diaphragm.

12. The lens barrel according to claim 1, further comprising:
    a zoom lens group;
    a mechanism configured to move the zoom lens group in a direction of an optical axis; and
    a zoom ring mechanically coupled to the mechanism, wherein
    the open F value varying device includes a cam plate having a plurality of cam grooves, the cam plate being mechanically coupled to the zoom ring, and
    a rotational movement of the zoom ring moves the mechanism and rotates the cam plate around the optical axis.

13. The lens barrel according to claim 1, wherein the open F value varying device is configured to pass a substantially constant amount of light to the optical system when the focal length of the optical system does not exceed a predetermined focal length, and
    to decrease the amount of light passed to the optical system based on the focal length of the optical system, when the focal length of the optical system is greater than the predetermined focal length.

14. A lens barrel, comprising:
    an optical system configured to change a focal length;
    a first diaphragm controlling an amount of light in a range between a first light amount value and a second light amount value, of light incident on the optical system and passing to an image forming surface; and
    a second diaphragm controlling the value of the second light amount value based on the focal length of the optical system, thereby controlling a maximum of the amount of light that can be passed to the image forming surface regardless of the controlling by the first diaphragm, the second diaphragm including
    a base plate substantially perpendicular to and centered about an optical axis of the optical system, the base plate including a plurality of base pins,
    a cam plate substantially perpendicular to and centered about the optical axis, the cam plate including a plurality of cam grooves disposed around the optical axis, the plurality of cam grooves being divided into two groups, one group having a position spaced a first radial distance away from a center of the cam plate, and a second group having a position spaced a second radial distance, greater than the first radial distance, away from the center, and
    a plurality of blades, each blade of the plurality of blades attached to one base pin of the plurality of base pins and including a cam pin projected from a face of the blade and engaged in one of the plurality of cam grooves, the plurality of blades rotating about the base pins according to rotation of the cam plate and a shape of the cam grooves.

15. A lens barrel, comprising:
a plurality of lenses disposed in an optical axis direction;
a first diaphragm including an aperture of an adjustable size, the first diaphragm surrounded on both sides in the optical axis direction with at least one of the plurality of lenses;
a second diaphragm including an aperture of an adjustable size, the second diaphragm surrounded on both sides in the optical axis direction with at least one of the plurality of lenses, and the second diaphragm including
a base plate substantially perpendicular to and centered about an optical axis of the optical system, the base plate including a plurality of base pins,
a cam plate substantially perpendicular to and centered about the optical axis, the cam plate including a plurality of cam grooves disposed around the optical axis, the plurality of cam grooves being divided into two groups, one group having a position spaced a first radial distance away from a center of the cam plate, and a second group having a position spaced a second radial distance, greater than the first radial distance, away from the center, and
a plurality of blades, each blade of the plurality of blades attached to one base pin of the plurality of base pins and including a cam pin projected from a face of the blade and engaged in one of the plurality of cam grooves, the plurality of blades rotating about the base pins according to rotation of the cam plate and a shape of the cam grooves;
a zoom controller configured to move one or more of the plurality of the lenses to change a focal length of the lens barrel, and mechanically coupled to the first diaphragm, changing the aperture of the first diaphragm concurrently with changing the focal length; and
an iris ring mechanically coupled to the second diaphragm and changing the aperture of the second diaphragm.

16. The lens barrel according to claim 1, wherein
the cam grooves in the first group are linearly shorter than the cam grooves in the second group.

17. The lens barrel according to claim 1, wherein
the shape of the cam grooves is configured to not reduce a light amount incident to the optical system when the cam plate is rotated less than a predetermined amount, and to reduce the amount of light incident to the optical system when the cam plate is rotated more than the predetermined amount.

18. The lens barrel according to claim 17, wherein
rotation of the cam plate less than the predetermined amount corresponds to changing the focal length of the optical system from a widest possible zoom setting to a predetermined zoom setting.

* * * * *